(12) United States Patent
Hofer (10) Patent No.: US 10,736,462 B2
(45) Date of Patent: Aug. 11, 2020

(54) PORTABLE COOKING GRILL SYSTEM (71) Applicant: Greg Jones Hofer, Victoria (CA)

(72) Inventor: Greg Jones Hofer, Victoria (CA)

( * ) Notice: Subject to any disclaimer, the term of this patent is extended or adjusted under 35 U.S.C. 154(b) by 10 days.

(21) Appl. No.: 15/678,539

(22) Filed: Aug. 16, 2017

(65) Prior Publication Data

US 2019/0053665 A1 Feb. 21, 2019

(51) Int. Cl.
*A47J 37/07* (2006.01)
*A47J 33/00* (2006.01)

(52) U.S. Cl.
CPC .......... *A47J 37/0763* (2013.01); *A47J 33/00* (2013.01); *A47J 37/0772* (2013.01); *A47J 2037/0777* (2013.01)

(58) Field of Classification Search
CPC .......... F24B 1/182; F24B 1/022; F24B 1/181; F24B 1/189; F24B 1/19; F24B 1/195; F24B 1/028; F24C 1/16
USPC .......... 126/29, 30, 28, 9 R, 9 B, 6, 15 R, 7
See application file for complete search history.

(56) References Cited

U.S. PATENT DOCUMENTS

| | | | | |
|---|---|---|---|---|
| 34,047 A * | 1/1862 | Ball | ............ | A47B 3/10 190/12 R |
| 329,903 A * | 11/1885 | Hogeland | ............ | A47B 3/087 108/35 |
| 353,923 A * | 12/1886 | Conwell | ............ | A47B 3/087 108/35 |
| 358,803 A * | 3/1887 | Chestnut | ............ | B25J 15/0616 294/2 |
| 561,857 A * | 6/1896 | Baxter | ............ | A47B 3/0815 248/439 |
| 573,756 A * | 12/1896 | Bergstresser | ............ | A47B 37/00 108/31 |
| 589,056 A * | 8/1897 | White | ............ | A47B 9/08 108/148 |
| 643,511 A * | 2/1900 | Lloyd | ............ | A47B 3/087 108/36 |
| 718,714 A * | 1/1903 | Larson | ............ | A47J 37/067 126/153 |
| 739,862 A * | 9/1903 | Harrod | ............ | A47B 3/10 190/12 R |
| 764,359 A * | 7/1904 | Huffman | ............ | A47B 3/10 190/12 R |
| 793,151 A * | 6/1905 | Palmer | ............ | A47B 3/0815 248/439 |
| 801,157 A * | 10/1905 | Raymond | ............ | A47B 3/087 108/35 |
| 803,200 A * | 10/1905 | Stripe | ............ | B65D 7/26 220/6 |
| 823,699 A * | 6/1906 | Roemer | ............ | B65D 25/32 220/756 |
| 913,148 A * | 2/1909 | McNulty | ............ | A47J 37/0713 126/41 R |

(Continued)

*Primary Examiner* — Avinash A Savani
*Assistant Examiner* — Martha M Becton
(74) *Attorney, Agent, or Firm* — Orin Del Vecchio (57) ABSTRACT

A portable cooking grill system includes a cooking grill assembly having a grilling-rack comprising a first-section and a second-section, a frame having a plurality of foldable legs, and a detachable handle. The cooking grill assembly includes the grilling-rack and the frame in foldable functional combination such that the portable cooking grill system is configured for portable cooking use and ease of storage for backpacking, camping and other activities.

19 Claims, 5 Drawing Sheets

(56) References Cited

U.S. PATENT DOCUMENTS

| | | | | |
|---|---|---|---|---|
| 923,500 A * | 6/1909 | Dress | A47B 3/087 | 108/36 |
| 984,529 A * | 2/1911 | Bereman | A47B 3/087 | 108/35 |
| 1,054,188 A * | 2/1913 | Ehmann | F16M 11/00 | 248/121 |
| 1,062,996 A * | 5/1913 | Sornberger | A47B 3/087 | 108/36 |
| 1,063,642 A * | 6/1913 | Birdsall | A47B 1/08 | 108/36 |
| 1,128,811 A * | 2/1915 | Miles | A47B 3/10 | 190/12 R |
| 1,138,156 A * | 5/1915 | Stroud | A47B 3/0815 | 108/18 |
| 1,147,255 A * | 7/1915 | Loranger | A47B 3/10 | 190/12 R |
| 1,170,977 A * | 2/1916 | König | A47B 3/087 | 108/36 |
| 1,239,023 A * | 9/1917 | McElhinney | A47B 3/10 | 312/241 |
| 1,244,357 A * | 10/1917 | Moore | A47B 3/0815 | 119/786 |
| 1,309,049 A * | 7/1919 | Syrett | A47B 3/0815 | 248/439 |
| 1,333,335 A * | 3/1920 | O'Kane | F24B 1/205 | 126/29 |
| 1,350,834 A * | 8/1920 | Nierodka | A47B 3/087 | 190/12 R |
| 1,368,388 A * | 2/1921 | Church | F24B 1/205 | 248/156 |
| 1,405,362 A * | 1/1922 | Van Etten | A47B 3/083 | 108/171 |
| 1,435,346 A * | 11/1922 | Stoll | F24C 1/16 | 126/38 |
| 1,435,747 A * | 11/1922 | Seiling | F24B 1/205 | 126/30 |
| 1,455,216 A * | 5/1923 | Lombardi | A47J 45/10 | 294/31.1 |
| 1,473,056 A * | 11/1923 | Steen | F24B 1/022 | 248/439 |
| 1,483,420 A * | 2/1924 | Ewing | F24B 1/202 | 126/30 |
| 1,484,476 A * | 2/1924 | Currie | F24B 1/205 | 126/29 |
| 1,540,077 A * | 6/1925 | Klinert | F24C 1/16 | 126/304 R |
| 1,572,282 A * | 2/1926 | Grignon | A47B 3/04 | 108/167 |
| 1,589,540 A * | 6/1926 | Meek | A47B 3/087 | 108/36 |
| 1,611,743 A * | 12/1926 | Hanson | F24B 1/022 | 248/439 |
| 1,614,187 A * | 1/1927 | Coggins | A47B 3/0918 | 108/35 |
| 1,617,806 A * | 2/1927 | Hanson | F24C 1/16 | 126/30 |
| 1,618,327 A * | 2/1927 | Dewey | A47B 3/0918 | 108/171 |
| 1,646,922 A * | 10/1927 | MacKinnon | A47B 3/087 | 190/12 R |
| 1,709,928 A * | 4/1929 | Whitney | A47B 3/0815 | 108/18 |
| 1,765,766 A * | 6/1930 | Lyon | A47B 3/0918 | 108/131 |
| 1,830,230 A * | 11/1931 | Gwyer | A47J 37/067 | 126/30 |
| 1,885,685 A * | 11/1932 | Collignon | A47B 3/087 | 108/36 |
| 2,003,974 A * | 6/1935 | Pearson | F24B 1/205 | 126/25 R |
| 2,058,172 A * | 10/1936 | Myers | A47J 37/0763 | 126/25 R |
| 2,058,836 A * | 10/1936 | Silver | F24B 1/205 | 126/29 |
| 2,086,463 A * | 7/1937 | Bram | A47B 3/0912 | 108/65 |
| 2,148,439 A * | 2/1939 | Crawford | A47J 37/00 | 126/29 |
| 2,152,168 A * | 3/1939 | Anderson | F24B 1/205 | 126/25 R |
| 2,162,636 A * | 6/1939 | Peoples | A47J 37/0763 | 126/30 |
| 2,216,457 A * | 10/1940 | Salisbury | A47J 36/20 | 126/211 |
| 2,343,537 A * | 3/1944 | De Saussure | A47B 3/083 | 108/132 |
| 2,357,699 A * | 9/1944 | Stark | F24B 1/205 | 126/214 R |
| 2,408,859 A * | 10/1946 | Leake, Jr. | A47J 37/0763 | 126/9 R |
| 2,464,337 A * | 3/1949 | Morris | B65D 5/2047 | 229/117.21 |
| 2,467,480 A * | 4/1949 | Hudson | A47J 37/07 | 126/9 B |
| 2,469,698 A * | 5/1949 | Morgan | A47J 37/0763 | 126/9 R |
| 2,471,420 A * | 5/1949 | Elkin | A47J 36/24 | 126/33 |
| 2,486,708 A * | 11/1949 | Fader | A47J 37/0763 | 126/25 R |
| 2,498,984 A * | 2/1950 | Doppelheuer | F24B 1/202 | 126/29 |
| 2,515,521 A * | 7/1950 | Loffredo | F24B 1/205 | 126/9 B |
| 2,520,389 A * | 8/1950 | Ferris | A47J 37/0694 | 211/195 |
| 2,542,394 A * | 2/1951 | Cohen | A47B 3/087 | 108/36 |
| 2,596,250 A * | 5/1952 | Klingler | A61G 1/0212 | 296/20 |
| 2,597,477 A * | 5/1952 | Haislip | F24B 1/205 | 126/25 R |
| 2,604,884 A * | 7/1952 | Brooks | A47J 37/0772 | 108/106 |
| 2,608,190 A * | 8/1952 | Winning | A47J 37/041 | 126/147 |
| 2,613,978 A * | 10/1952 | Marulli | A47J 45/10 | 294/27.1 |
| 2,619,394 A * | 11/1952 | Mahr | A47B 87/002 | 108/64 |
| 2,631,579 A * | 3/1953 | Metzger | A47J 37/0763 | 126/29 |
| 2,643,926 A * | 6/1953 | Pucci | A47B 3/083 | 108/131 |
| 2,645,539 A * | 7/1953 | Thompson | A47B 3/087 | 108/175 |
| 2,664,329 A * | 12/1953 | Kraska | A47B 3/0913 | 108/133 |
| 2,672,387 A * | 3/1954 | Barricks | A47B 3/0918 | 108/133 |
| 2,681,841 A * | 6/1954 | Sperry | A47B 3/083 | 108/129 |
| 2,715,558 A * | 8/1955 | Bell | A47B 3/087 | 108/35 |
| 2,719,067 A * | 9/1955 | Percy | A47B 3/087 | 108/35 |
| 2,747,957 A * | 5/1956 | Lencioni | A47B 3/087 | 108/36 |
| 2,755,153 A * | 7/1956 | Rachman | A47B 3/083 | 108/35 |
| 2,780,215 A * | 2/1957 | Vacanti, Jr. | F24B 1/205 | 126/9 R |
| 2,791,959 A * | 5/1957 | Pirz | A47J 37/0763 | 99/421 R |
| 2,823,087 A * | 2/1958 | Zimmer | A47B 3/0815 | 108/18 |
| 2,839,043 A * | 6/1958 | La Born | F24B 1/205 | 126/30 |

(56) References Cited

U.S. PATENT DOCUMENTS

| | | | | |
|---|---|---|---|---|
| 2,842,044 A * | 7/1958 | Kirk | ............... | A47J 37/0704 99/339 |
| 2,868,599 A * | 1/1959 | Victor | ............... | A47B 3/087 108/36 |
| 2,871,076 A * | 1/1959 | Mell | ............... | A47B 3/087 108/36 |
| 2,891,832 A * | 6/1959 | Greenwald | ............... | A47B 3/087 248/434 |
| 2,893,373 A * | 7/1959 | Rundle | ............... | A47J 37/0763 126/9 R |
| 2,913,294 A * | 11/1959 | Linde | ............... | A47B 25/003 108/167 |
| 2,917,039 A * | 12/1959 | Sheedlo | ............... | A47J 37/0763 126/306 |
| 2,959,165 A * | 11/1960 | Morris | ............... | A47J 37/0763 126/9 R |
| 2,985,164 A * | 5/1961 | Imoto | ............... | F24B 1/205 126/25 R |
| 2,994,315 A * | 8/1961 | Bussing | ............... | A47J 37/0763 126/9 R |
| 2,994,316 A * | 8/1961 | Brender | ............... | A47J 37/0704 126/9 R |
| 3,013,670 A * | 12/1961 | Mayer | ............... | A47B 3/12 108/181 |
| 3,029,115 A * | 4/1962 | Rachman | ............... | A47B 3/087 108/129 |
| 3,064,637 A * | 11/1962 | Thomson | ............... | A47J 37/0763 126/9 R |
| 3,109,420 A * | 11/1963 | Ott | ............... | F24C 1/16 126/9 R |
| 3,149,623 A * | 9/1964 | Orr, Jr. | ............... | A47J 37/0763 126/9 R |
| 3,191,592 A * | 6/1965 | Lorbacher | ............... | A47J 37/0704 126/25 A |
| 3,237,621 A * | 3/1966 | Staley | ............... | A47J 37/0731 126/25 R |
| 3,267,885 A * | 8/1966 | Shore | ............... | A47B 3/083 108/170 |
| 3,304,891 A * | 2/1967 | Rachman | ............... | A47B 3/083 108/36 |
| 3,306,279 A * | 2/1967 | Dale | ............... | A47J 37/108 126/25 A |
| 3,306,281 A * | 2/1967 | Hoebel | ............... | A47J 37/0763 126/25 R |
| 3,330,204 A * | 7/1967 | Little | ............... | F24C 3/14 99/339 |
| 3,368,504 A * | 2/1968 | Cohen | ............... | A47B 3/087 108/131 |
| 3,389,651 A * | 6/1968 | Schultz | ............... | A47J 37/0718 126/25 A |
| 3,393,670 A * | 7/1968 | Psarris | ............... | F24C 1/16 126/25 R |
| 3,490,433 A * | 1/1970 | Busenbarrick | ............... | A47J 37/0763 126/9 R |
| 3,769,920 A * | 11/1973 | Weiss | ............... | A47B 3/0918 108/133 |
| 3,791,368 A * | 2/1974 | Hunt | ............... | A47J 37/0713 126/25 A |
| 3,878,797 A * | 4/1975 | Patterson | ............... | A47B 3/083 108/90 |
| 3,892,222 A * | 7/1975 | Darbo | ............... | F24B 1/205 126/9 R |
| 3,905,286 A * | 9/1975 | Le Grady | ............... | A47J 37/0763 126/25 R |
| 3,947,657 A * | 3/1976 | Ershler | ............... | A47J 37/103 219/450.1 |
| 3,975,999 A * | 8/1976 | Carroll | ............... | A47J 37/0763 99/449 |
| D243,436 S * | 2/1977 | Vida | ............... | D7/332 |
| 4,109,567 A * | 8/1978 | Gage | ............... | A47J 33/00 108/147.13 |
| 4,133,335 A * | 1/1979 | Malafouris | ............... | F24B 1/205 126/2 |
| 4,143,601 A * | 3/1979 | Pike | ............... | A47B 3/087 108/129 |
| 4,144,822 A * | 3/1979 | Roberts | ............... | A47B 3/0815 108/125 |
| 4,211,206 A * | 7/1980 | Darbo | ............... | A47J 37/0763 126/25 R |
| D256,316 S * | 8/1980 | Nichols, Jr. | ............... | D7/332 |
| 4,297,953 A * | 11/1981 | Shy | ............... | A47B 3/0815 108/131 |
| D263,436 S * | 3/1982 | Greenwold | ............... | D6/675.5 |
| 4,333,638 A * | 6/1982 | Gillotti | ............... | A47B 3/087 5/613 |
| 4,334,516 A * | 6/1982 | Dittmer | ............... | A47J 37/0763 126/25 R |
| 4,338,912 A * | 7/1982 | Gaskins | ............... | F24B 1/202 126/25 A |
| 4,341,164 A * | 7/1982 | Johnson | ............... | A47B 3/10 108/115 |
| 4,392,437 A * | 7/1983 | Wallace | ............... | A47B 3/00 108/129 |
| 4,393,857 A * | 7/1983 | Sanford | ............... | F24B 1/205 126/30 |
| 4,453,529 A * | 6/1984 | Spencer | ............... | A47J 37/0763 126/25 R |
| 4,475,528 A * | 10/1984 | Kuchenbrod | ............... | F24B 1/205 126/29 |
| 4,488,535 A * | 12/1984 | Johnson | ............... | A47J 37/0763 126/25 A |
| 4,489,661 A * | 12/1984 | Fitzgerald | ............... | A47B 3/083 108/115 |
| 4,494,465 A * | 1/1985 | Fick, Jr. | ............... | A47B 3/083 108/131 |
| 4,526,158 A * | 7/1985 | Lee | ............... | A47J 37/0763 126/25 A |
| 4,532,912 A * | 8/1985 | Burnside, III | ............... | F24B 1/182 126/29 |
| 4,553,523 A * | 11/1985 | Stohrer, Jr. | ............... | A47J 37/0694 126/152 B |
| 4,621,608 A * | 11/1986 | Lee | ............... | A47J 37/0763 126/25 A |
| 4,625,655 A * | 12/1986 | Brickman | ............... | A47B 3/02 108/25 |
| 4,625,656 A * | 12/1986 | Brickman | ............... | A47B 3/02 108/25 |
| 4,884,499 A * | 12/1989 | Rensch | ............... | A47J 37/0688 99/449 |
| 4,920,950 A * | 5/1990 | Johnson | ............... | F24B 1/205 126/154 |
| 4,934,549 A * | 6/1990 | Allen | ............... | A45C 9/00 190/11 |
| 4,943,041 A * | 7/1990 | Romein | ............... | A47B 3/083 108/36 |
| 4,949,649 A * | 8/1990 | Terres | ............... | E04H 3/28 108/116 |
| 4,953,473 A * | 9/1990 | Tomaka | ............... | A47B 23/001 108/127 |
| 5,009,170 A * | 4/1991 | Spehar | ............... | A47B 3/10 108/132 |
| 5,065,734 A * | 11/1991 | Elliott | ............... | A47J 37/0763 126/25 R |
| 5,103,799 A * | 4/1992 | Atanasio | ............... | A47J 37/0763 126/25 A |
| 5,133,333 A * | 7/1992 | Stout | ............... | A47J 37/0694 108/35 |
| 5,357,872 A * | 10/1994 | Wilmore | ............... | A47B 3/087 108/132 |
| 5,452,706 A * | 9/1995 | Meza | ............... | A47J 37/0763 126/29 |
| D413,218 S * | 8/1999 | Doty | ............... | D6/566 |
| 5,931,085 A * | 8/1999 | Benzschawel | ............... | A47J 37/0763 126/25 A |
| 5,941,181 A * | 8/1999 | Hornberger | ............... | A47B 3/0911 108/131 |

(56) References Cited

U.S. PATENT DOCUMENTS

| | | | | |
|---|---|---|---|---|
| 5,983,807 A * | 11/1999 | Tarnay | A47B 3/0912 108/131 |
| 6,065,394 A * | 5/2000 | Gelderman | A21B 3/131 99/424 |
| 6,105,569 A * | 8/2000 | Andress | A47J 37/0763 126/25 A |
| 6,131,560 A * | 10/2000 | Healy | A47J 37/0763 126/30 |
| 6,135,014 A * | 10/2000 | Chang | A47J 37/0763 126/25 R |
| 6,234,162 B1 * | 5/2001 | Wenker | F24B 1/202 126/29 |
| 6,321,741 B1 * | 11/2001 | Thompson | A47J 37/0772 126/25 A |
| 6,334,400 B1 * | 1/2002 | Nien | A47B 3/087 108/115 |
| D457,752 S * | 5/2002 | Wood | D6/566 |
| 6,439,111 B1 * | 8/2002 | Lu | A47J 37/0763 126/25 R |
| 6,454,357 B1 * | 9/2002 | Foulger | A47C 16/025 108/131 |
| 6,457,594 B1 * | 10/2002 | Tiemann | A47J 36/22 211/181.1 |
| 6,546,851 B1 * | 4/2003 | Osborne | A47J 37/0763 126/30 |
| 6,561,107 B1 * | 5/2003 | Wood | A47B 3/0812 108/132 |
| 6,684,426 B1 * | 2/2004 | Lin | A47B 3/087 108/132 |
| 6,719,250 B2 * | 4/2004 | FitzSimons | A47J 33/00 126/30 |
| 6,895,958 B1 * | 5/2005 | Komosky | F24B 1/182 126/25 A |
| 6,986,722 B2 * | 1/2006 | Dadbeh | A63B 67/04 108/168 |
| 7,080,640 B2 * | 7/2006 | Sanders | A47J 33/00 126/30 |
| 7,140,308 B2 * | 11/2006 | Tsai | A47B 3/087 108/169 |
| 7,426,928 B2 * | 9/2008 | Sanders | A47J 33/00 108/1 |
| 7,445,004 B1 * | 11/2008 | Milner | F24B 1/205 126/215 |
| 7,461,601 B2 * | 12/2008 | Jin | A47B 3/087 108/132 |
| 7,634,969 B2 * | 12/2009 | Neunzert | A47B 3/00 108/132 |
| 7,757,617 B2 * | 7/2010 | Larcom | A47B 3/0815 108/132 |
| 8,091,490 B2 * | 1/2012 | Branch | A47B 3/087 108/125 |
| 8,156,875 B2 * | 4/2012 | Neunzert | A47B 3/083 108/129 |
| 8,166,894 B1 * | 5/2012 | Branch | A47B 3/087 108/125 |
| 8,176,855 B1 * | 5/2012 | Cannon | A47B 13/16 108/25 |
| 8,397,653 B2 * | 3/2013 | Ashby | A47B 3/0818 108/115 |
| 8,490,554 B2 * | 7/2013 | Jin | A47B 3/0915 108/132 |
| 8,544,393 B2 * | 10/2013 | Branch | A47B 3/087 108/125 |
| 8,555,789 B2 * | 10/2013 | Jin | A47B 3/087 108/129 |
| 8,555,791 B2 * | 10/2013 | Jin | A47B 3/087 108/168 |
| 8,556,310 B1 * | 10/2013 | Nabors | A47J 37/0786 294/26 |
| 8,607,777 B2 * | 12/2013 | Ducate, Jr. | A47J 37/0786 126/1 R |
| 8,677,912 B1 * | 3/2014 | Tsai | F16C 11/10 108/132 |
| 8,726,817 B2 * | 5/2014 | Bennett | A47B 3/0912 108/115 |
| 8,881,661 B2 * | 11/2014 | Tsai | F16C 11/10 108/132 |
| 8,899,145 B2 * | 12/2014 | Harrison | A47J 37/067 294/10 |
| 8,904,943 B2 * | 12/2014 | Jin | A47B 3/0818 108/127 |
| 8,931,421 B2 * | 1/2015 | Tsai | A47B 3/087 108/132 |
| 9,010,312 B1 * | 4/2015 | Rinderle | A47J 33/00 126/30 |
| 9,089,204 B2 * | 7/2015 | Tsai | A47B 3/087 |
| 9,101,209 B2 * | 8/2015 | Bennett | A47B 3/0912 |
| 9,138,050 B2 * | 9/2015 | Peery | A47B 3/0912 |
| 9,273,720 B2 * | 3/2016 | Tsai | F16C 11/10 |
| 9,277,808 B2 * | 3/2016 | Cai | A47B 3/0912 |
| 9,351,563 B2 * | 5/2016 | Bennett | A47B 3/0912 |
| 9,370,277 B2 * | 6/2016 | Weaver | A47J 37/0786 |
| 9,480,331 B2 * | 11/2016 | Tsai | A47B 3/087 |
| 9,504,355 B2 * | 11/2016 | Lee | A47J 37/101 |
| 9,526,328 B2 * | 12/2016 | Illulian | A47B 3/06 |
| 9,661,915 B2 * | 5/2017 | Tsai | A47B 3/087 |
| 9,730,514 B2 * | 8/2017 | Peery | A47B 3/0912 |
| 9,750,338 B2 * | 9/2017 | Turner | A47B 3/0818 |
| 9,750,339 B2 * | 9/2017 | Turner | A47B 3/083 |
| 9,763,513 B2 * | 9/2017 | Cai | A47B 3/0912 |
| 9,770,095 B2 * | 9/2017 | Tsai | A47B 3/087 |
| D836,726 S * | 12/2018 | Wasserman | D21/397 |
| 10,405,645 B1 * | 9/2019 | Liu | A47B 3/10 |
| 10,527,289 B2 * | 1/2020 | Pontano | F24C 1/16 |
| 10,582,766 B2 * | 3/2020 | Leng | A47B 3/0809 |
| 2005/0061214 A1 * | 3/2005 | Tsai | A47B 3/087 108/132 |
| 2005/0160952 A1 * | 7/2005 | Tsai | A47B 3/087 108/169 |
| 2005/0241550 A1 * | 11/2005 | Neunzert | A47B 3/00 108/129 |
| 2005/0241551 A1 * | 11/2005 | Neunzert | A47B 3/0912 108/132 |
| 2005/0274302 A1 * | 12/2005 | Jin | A47B 3/087 108/126 |
| 2006/0076003 A1 * | 4/2006 | Smolinsky | A47J 37/067 126/9 R |
| 2006/0102163 A1 * | 5/2006 | Sanders | A47J 33/00 126/30 |
| 2006/0272630 A1 * | 12/2006 | Sanders | A47J 33/00 126/9 R |
| 2007/0101910 A1 * | 5/2007 | Haimoff | A47B 3/14 108/169 |
| 2008/0202390 A1 * | 8/2008 | Branch | A47B 3/087 108/35 |
| 2009/0078174 A1 * | 3/2009 | Larcom | A47B 3/0815 108/169 |
| 2011/0203493 A1 * | 8/2011 | Ashby | A47B 3/0818 108/127 |
| 2012/0111242 A1 * | 5/2012 | Branch | A47B 3/087 108/167 |
| 2012/0210915 A1 * | 8/2012 | Branch | A47B 3/087 108/167 |
| 2013/0025507 A1 * | 1/2013 | Jin | A47B 3/087 108/129 |
| 2013/0025509 A1 * | 1/2013 | Jin | A47B 3/0818 108/166 |
| 2013/0233210 A1 * | 9/2013 | Jin | A47B 3/0818 108/166 |
| 2013/0255545 A1 * | 10/2013 | Bennett | A47B 3/08 108/115 |
| 2013/0298893 A1 * | 11/2013 | Linville | F24B 1/205 126/30 |
| 2014/0115827 A1 * | 5/2014 | Tsai | A47B 13/06 16/348 |
| 2014/0116301 A1 * | 5/2014 | Tsai | A47B 13/083 108/169 |

(56) References Cited

U.S. PATENT DOCUMENTS

| | | | | |
|---|---|---|---|---|
| 2014/0116302 A1* | 5/2014 | Tsai | .................. | F16C 11/10 |
| | | | | 108/169 |
| 2014/0208992 A1* | 7/2014 | Cai | .................. | A47B 3/087 |
| | | | | 108/168 |
| 2014/0345505 A1* | 11/2014 | Bennett | .................. | A47B 3/08 |
| | | | | 108/168 |
| 2015/0020716 A1* | 1/2015 | Tsai | .................. | A47B 3/087 |
| | | | | 108/36 |
| 2015/0101515 A1* | 4/2015 | Jin | .................. | A47B 3/087 |
| | | | | 108/169 |
| 2015/0282606 A1* | 10/2015 | Tsai | .................. | A47B 3/0818 |
| | | | | 29/428 |
| 2015/0327669 A1* | 11/2015 | Bennett | .................. | A47B 3/08 |
| | | | | 108/168 |
| 2016/0183673 A1* | 6/2016 | Cai | .................. | A47B 3/087 |
| | | | | 108/168 |
| 2016/0227919 A1* | 8/2016 | Turner | .................. | A47B 3/083 |
| 2016/0227920 A1* | 8/2016 | Turner | .................. | A47B 3/0818 |
| 2016/0270522 A1* | 9/2016 | Winter | .................. | A47B 3/087 |
| 2016/0331124 A1* | 11/2016 | Tsai | .................. | A47B 3/0912 |
| 2017/0013956 A1* | 1/2017 | Tsai | .................. | A47B 13/083 |
| 2017/0205074 A1* | 7/2017 | Pontano | .................. | F24C 1/16 |
| 2017/0238698 A1* | 8/2017 | Nye | .................. | A47B 96/20 |
| 2018/0279768 A1* | 10/2018 | Leng | .................. | A47B 3/087 |
| 2018/0279771 A1* | 10/2018 | Leng | .................. | B32B 3/08 |
| 2018/0317708 A1* | 11/2018 | Kim | .................. | F24B 1/205 |
| 2019/0090626 A1* | 3/2019 | Leng | .................. | A47B 3/0918 |
| 2019/0298054 A1* | 10/2019 | Clegg | .................. | A47B 3/083 |
| 2020/0029684 A1* | 1/2020 | Jiang | .................. | A47C 7/624 |

* cited by examiner

PORTABLE COOKING GRILL SYSTEM

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of cooking grills and more specifically relates to a portable cooking grill.

2. Description of Related Art

Many people enjoy cooking various types of food on a grilling surface over an open fire, charcoal or other sources of heat. As is well known, this type of cooking is commonly referred to as grilling or barbequing. The grilling surface typically comprises a plurality of interconnected, spaced apart and generally parallel transverse rods or bars that form a grate on which the food is cooked. Alternatively, the grilling surface may comprise a ribbed surface or a generally flat, griddle-type of surface. While grilling of food is popular both at and away from the home, outdoor enthusiasts such as hunters, campers, hikers, recreational vehicle users and the like particularly tend to utilize and enjoy grilling their food. Although some of this popularity has to do with the lack of a non-grilling cooking device, such as an oven or stove, that is suitable or efficient for cooking food outdoors, much of the popularity of grilling has to do with the availability of fuel (such as wood), the taste of grilled foods, the avoidance of inside cooking odors and the overall enjoyment of the outdoor experience. For this reason, even those outdoor enthusiasts who do have ovens or stoves readily available, such as recreational vehicle users and many camper units, often prefer to grill their food over an open fire-type of heat source outside the recreational vehicle or other camp vehicle.

One alternative the outdoor enthusiast has to using a provided fire pit and his or her own grilling surface is to utilize a barbeque unit, which usually has a "built-in" grilling surface and is similar in configuration to the typical home unit that can be brought to the cooking location by the camping vehicle, recreational vehicle or other vehicle. Unfortunately, use of the home-type of barbeque units is generally not very practical due to the size of such units and the storage space available to the outdoor enthusiast for carrying the necessary materials and equipment to the camping location. In addition, many such units can be difficult to load and unload from the vehicle due to their size, weight and/or shape. As such, the typical outdoor enthusiast does not utilize these types of barbeque units for his or her grilling purposes. A suitable solution is desired.

U.S. Pat. No. 7,080,640 to Larry E. Sanders, et al. relates to a portable cooking grill having collapsible and extendable frame. The described portable cooking grill having collapsible and extendable frame includes a portable cooking grill that is configured with a collapsible frame having telescoping legs and a pair of frame sections that extend outwardly to allow the user to adjust the height of the grilling surface and the size of the frame. Each frame section has a pair of telescoping legs pivotally connected to the ends of side support rails which support a grill insert, having a pair of foldably connected grill sections, that form the grilling surface. The legs include a securing mechanism suitable for securing the legs at the height desired by the user. The side support rails slidably engage grill supports located at the sides of the grill insert to extend the position of the legs outwardly. A locking mechanism locks the legs in either their upstanding or folded positions. A slidable connecting mechanism locks the legs in or between the retracted and extended positions.

BRIEF SUMMARY OF THE INVENTION

In view of the foregoing disadvantages inherent in the known cooking grill art, the present disclosure provides a novel portable cooking grill system. The general purpose of the present disclosure, which will be described subsequently in greater detail, is to provide an efficient and effective portable grilling platform.

A portable cooking grill system is disclosed herein. The portable cooking grill system includes a cooking grill assembly including a grilling-rack comprising a first-section and a second-section, a frame having a plurality of foldable legs, and a detachable handle. The first-section and the second-section of the grilling-rack are hingedly connected via a connector creating a foldable grilling-rack. The plurality of foldable legs is configured to support the grilling-rack in an elevated position during use and fold into a compact state for a non-use-condition. The detachable handle is included for maneuvering the cooking grill assembly during use. The plurality of foldable legs may further comprise a support member including a locking device for preventing collapsing of the frame during use. The locking device may include a sliding lock brace for supporting the plurality of foldable legs when in an extended position. In a preferred embodiment, the frame comprises four of the plurality of foldable legs for supporting the grilling-rack. The plurality of foldable legs may be positioned at each corner of the grilling-rack providing a cooking platform.

The cooking grill assembly comprises the grilling-rack and the frame in foldable functional combination such that the portable cooking grill system is configured for portable cooking use and ease of storage.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a portable cooking grill system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to cooking grills and more particularly to a portable cooking grill system as used to improve the portability and convenience of cooking while on-the-go.

Generally, the portable cooking grill system is a foldable grill with a removable handle with a silicone cover. The legs may have a locking device to prevent collapsing. The compact design allows for a 'minimalist approach'. The portable cooking grill system is a collapsible compact grill with a removable handle that allows for minimalist use while backpacking or camping. The handle preferably has a silicon cover that prevents burns and is made of a material that will be durable for extended use. The device is easy to clean and transport. The locking legs fold up and down with a locking device to prevent the grill from collapsing giving the user a strong cooking platform.

Figure 1:
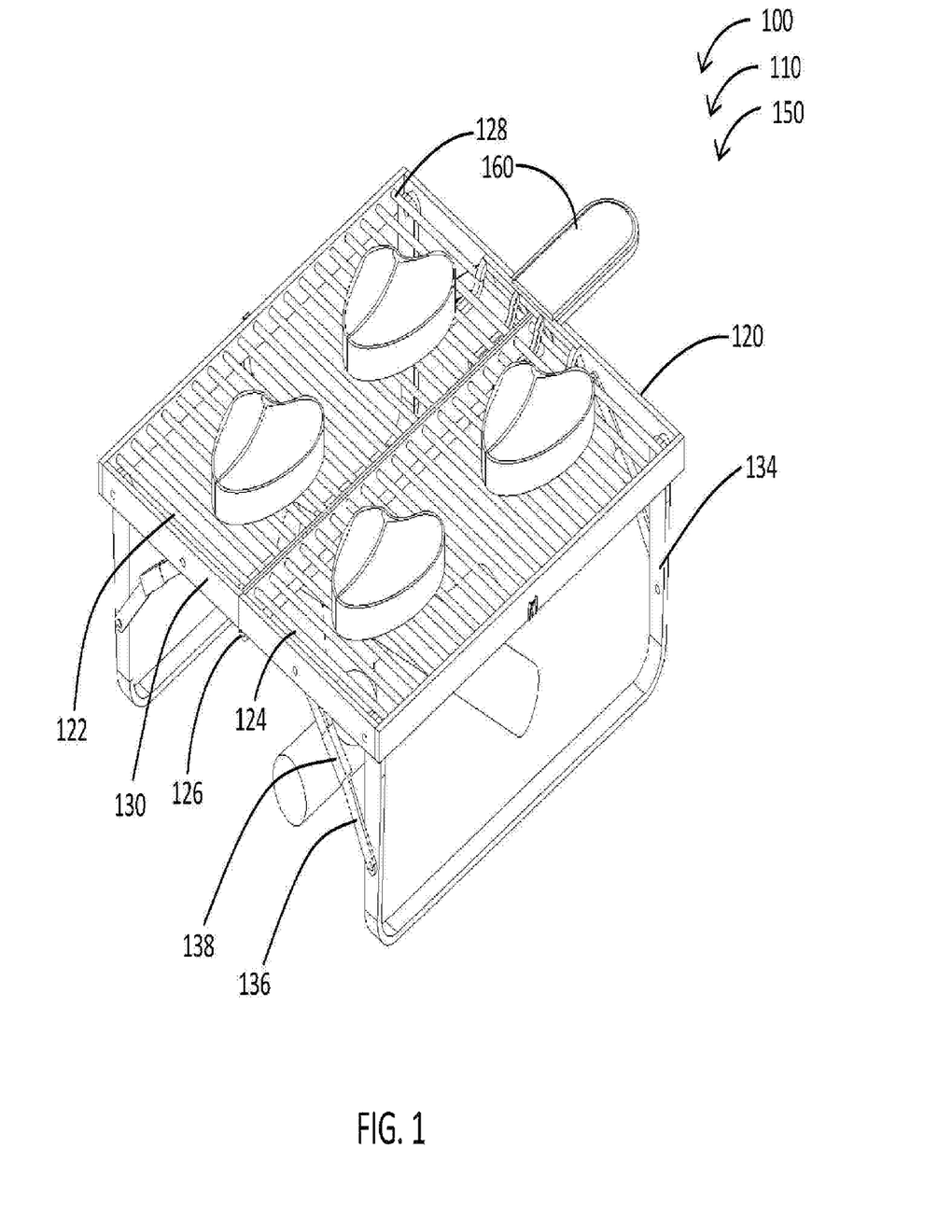
FIG. 1 is a perspective view of the portable cooking grill system during an 'in-use' condition, according to an embodiment of the disclosure.

Referring now more specifically to the drawings by numerals of reference, there is shown in FIGS. 1-5, various views of a portable cooking grill system 100. FIG. 1 shows a portable cooking grill system 100 during an 'in-use' condition 150, according to an embodiment of the present disclosure. As illustrated, the portable cooking grill system 100 may include a cooking grill assembly 110 including a grilling-rack 120 comprising a first-section 122 and a second-section 124, a frame 130 having a plurality of foldable legs 134, and a detachable handle 160. The first-section 122 and the second-section 124 of the grilling-rack 120 are hingedly connected via a connector 126 creating a foldable grilling-rack 120. The plurality of foldable legs 134 are configured to support the grilling-rack 120 in an elevated position during use and fold into a compact state for a non-use-condition 152. The detachable handle 160 is included for maneuvering the cooking grill assembly 110 during use. The cooking grill assembly 110 comprises the grilling-rack 120 and the frame 130 in foldable functional combination such that the portable cooking grill system 100 is configured for portable cooking use and ease of storage.

Figure 2:
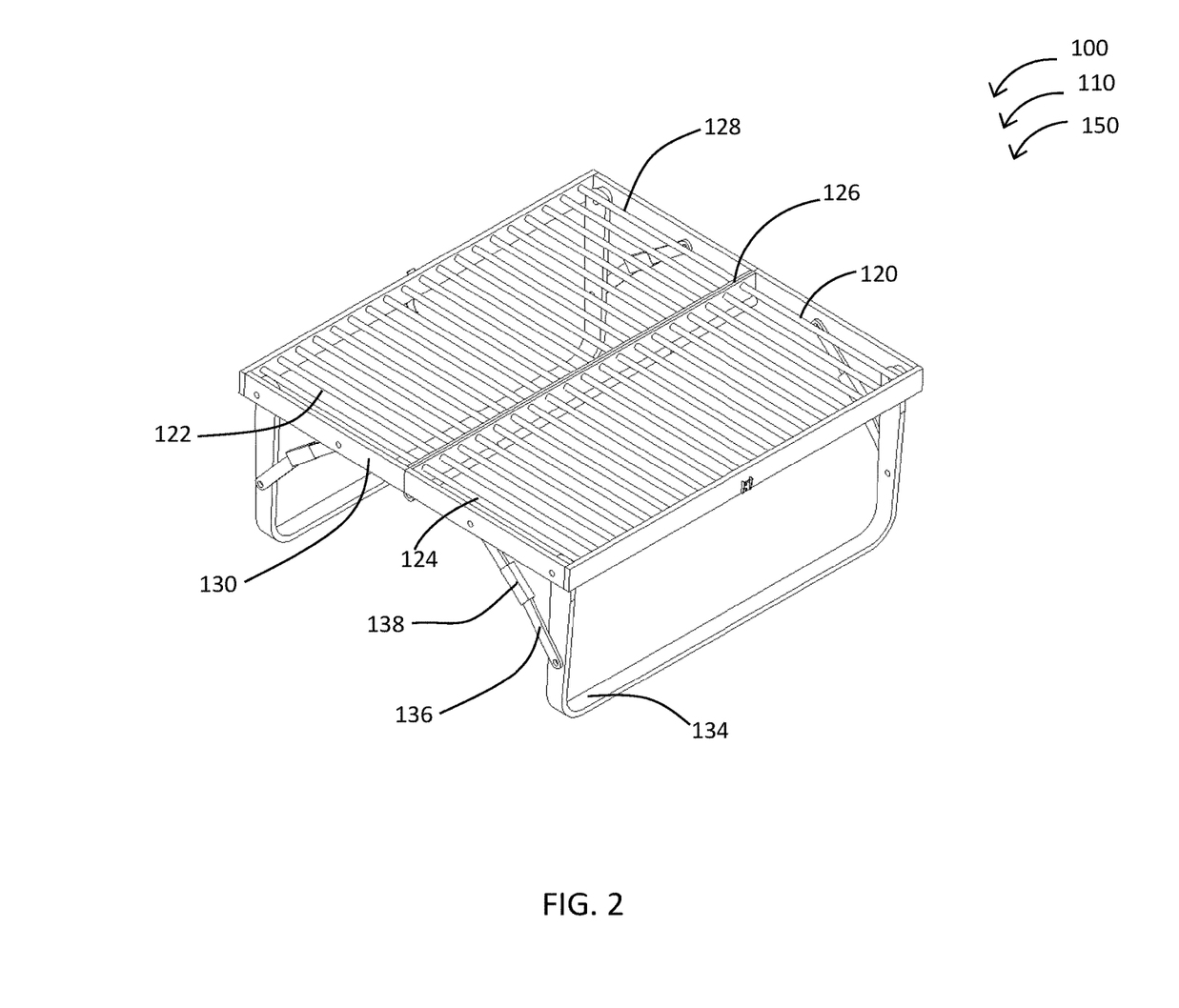
FIG. 2 is a perspective view of the portable cooking grill system of FIG. 1, according to an embodiment of the present disclosure.

FIG. 2 shows a perspective view of the portable cooking grill system 100 of FIG. 1, according to an embodiment of the present disclosure. As above, the portable cooking grill system 100 may include the cooking grill assembly 110 including the grilling-rack 120 comprising the first-section 122 and the second-section 124; the frame 130 having the plurality of foldable legs 134, and the detachable handle 160. The plurality of foldable legs 134 may further comprise a support member 136 including a locking device 138 for preventing collapsing of the frame during use. The locking device 138 may include a sliding lock brace for supporting the plurality of foldable legs 134 when in an extended position. In a preferred embodiment, the frame 130 comprises four of the plurality of foldable legs 134 for supporting the grilling-rack 120. The plurality of foldable legs 134 may be positioned at each corner of the grilling-rack 120 providing a cooking platform.

Figure 3:
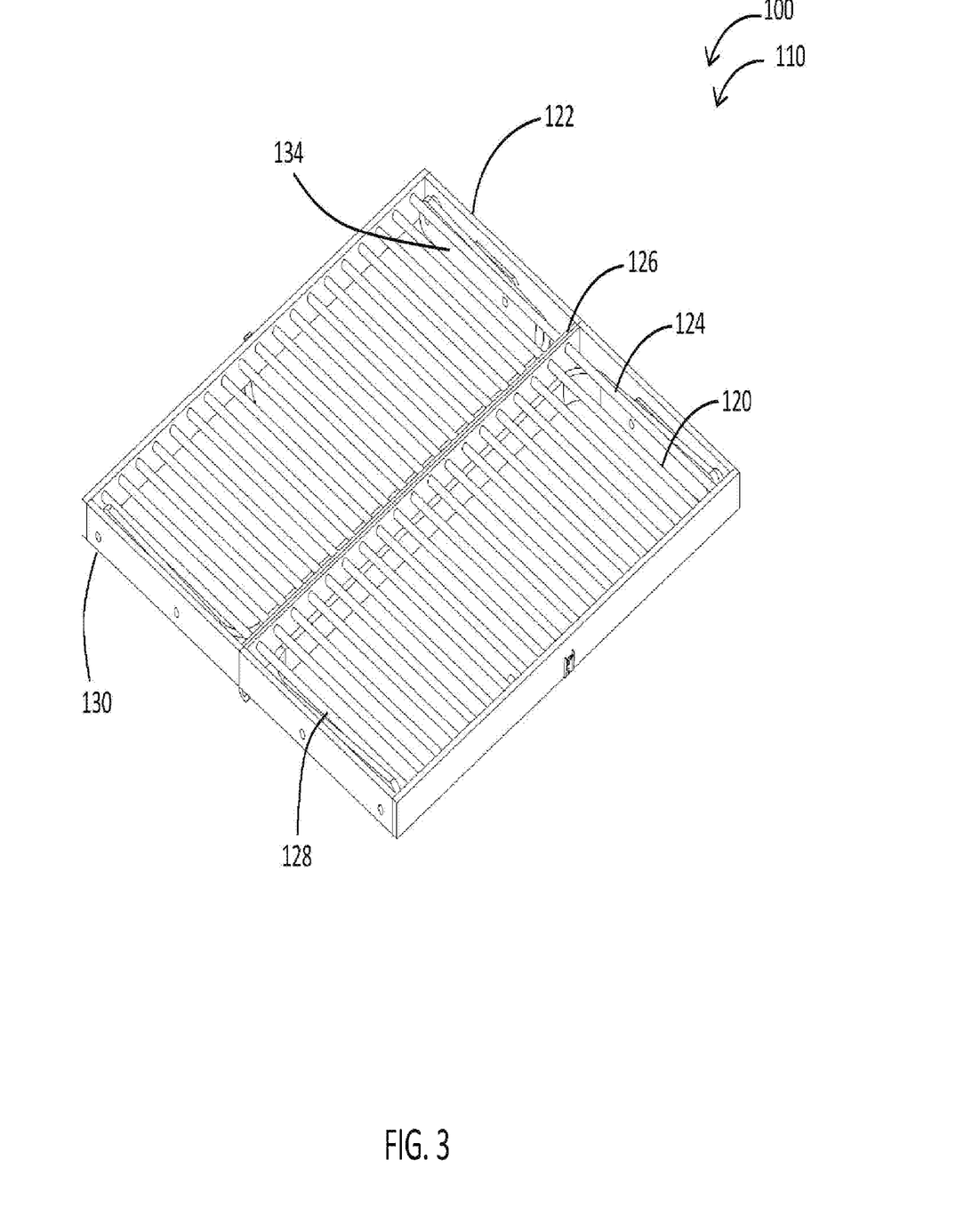
FIG. 3 is a perspective view of the portable cooking grill system of FIG. 1, according to an embodiment of the present disclosure.

FIG. 3 shows a perspective view of the portable cooking grill system 100 of FIG. 1, according to an embodiment of the present disclosure. As above, the portable cooking grill system 100 may include the cooking grill assembly 110 including the grilling-rack 120 comprising the first-section 122 and the second-section 124; the frame 130 is supported by the plurality of foldable legs 134, and the detachable handle 160. The first-section 122 and the second-section 124 of the grilling-rack 120 are hingedly connected via the connector 126 creating a foldable grilling-rack 120. The first-section 122 and the second-section 124 may each have a longest dimension along a length of the first-section 122 and the second-section 124. The connector 126 may connect along the length of both the first-section 122 and the second-section 124. The connector 126 may comprise a hinge allowing the first-section 122 and the second-section 124 to fold and pivot along a longest mutual edge between the first-section 122 and the second-section 124. The grilling-rack 120 comprises a grate having the series of rack-members 128 parallel to one another. The connector 126 may be perpendicular to the series of rack-members 128. The connector 126 may further comprise a lock for securing the device in an unfolded position. The first-section 122 and the second-section 124 share a common plane during an in-use condition. The first-section 122 and the second-section 124 share a stacked plane during the non-use-condition 152 (shown in FIG. 4). The first-section 122 and the second-section 124 pivot via the connector 126 in relation to each other about a centerline axis. The centerline axis passes through lengthwise in a preferred embodiment; thus being a novel feature.

Figure 4:
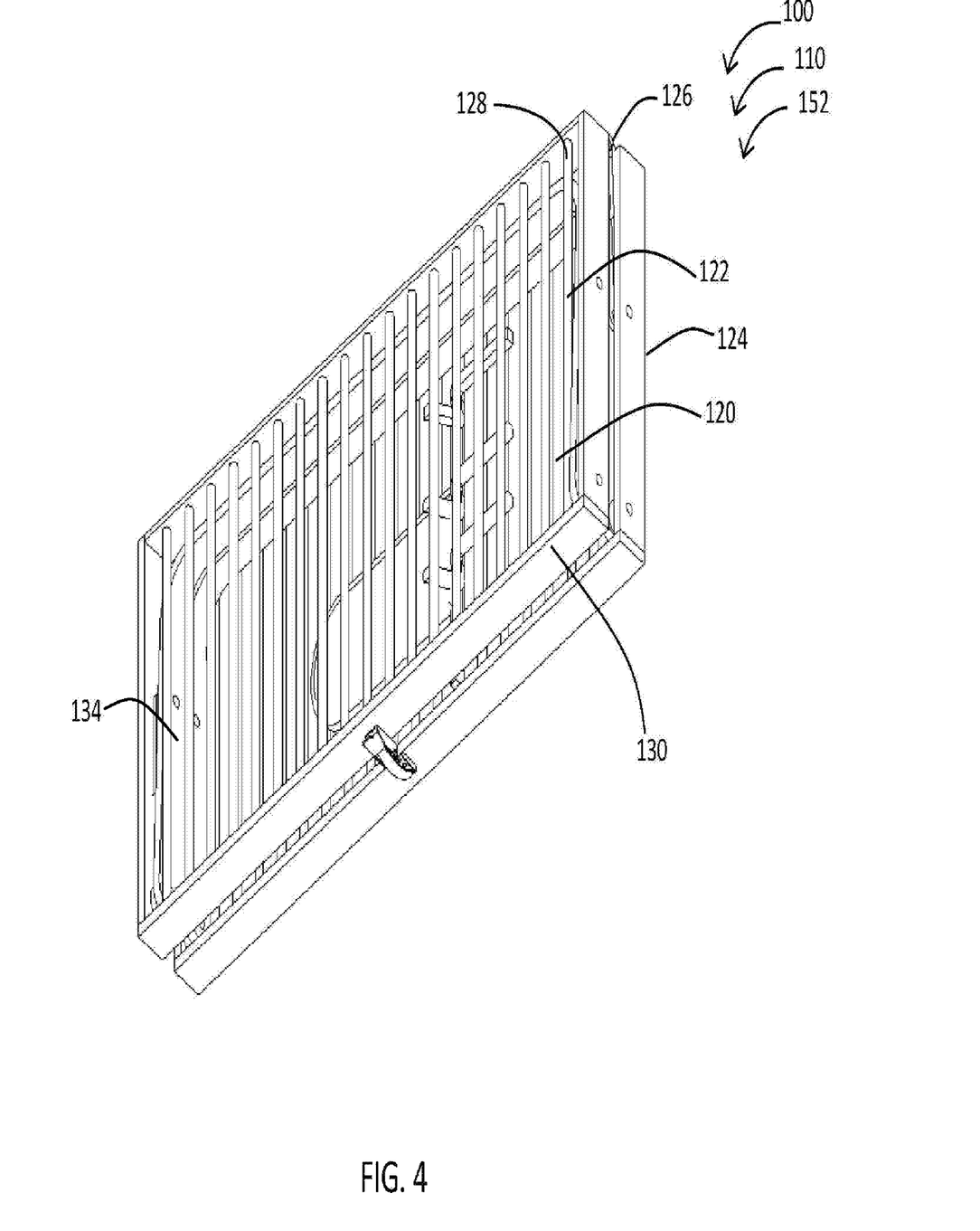
FIG. 4 is a perspective view of the portable cooking grill system of FIG. 1, according to an embodiment of the present disclosure.

FIG. 4 shows a perspective view of the portable cooking grill system 100 of FIG. 1, according to an embodiment of the present disclosure. As above, the portable cooking grill system 100 may include the detachable handle 160. The detachable handle 160 may be removeably coupleable to the frame 130. The detachable handle 160 comprises a silicone cover. The silicone cover is heat and fire resistant and allows a user to move the portable cooking grill system 100 during use and prevents burns. The grilling-rack 120 comprises a generally rectangular cooking platform. The cooking grill assembly 110, when the plurality of foldable legs 134 are in a locked position, is approximately 9 inches tall.

Figure 5:
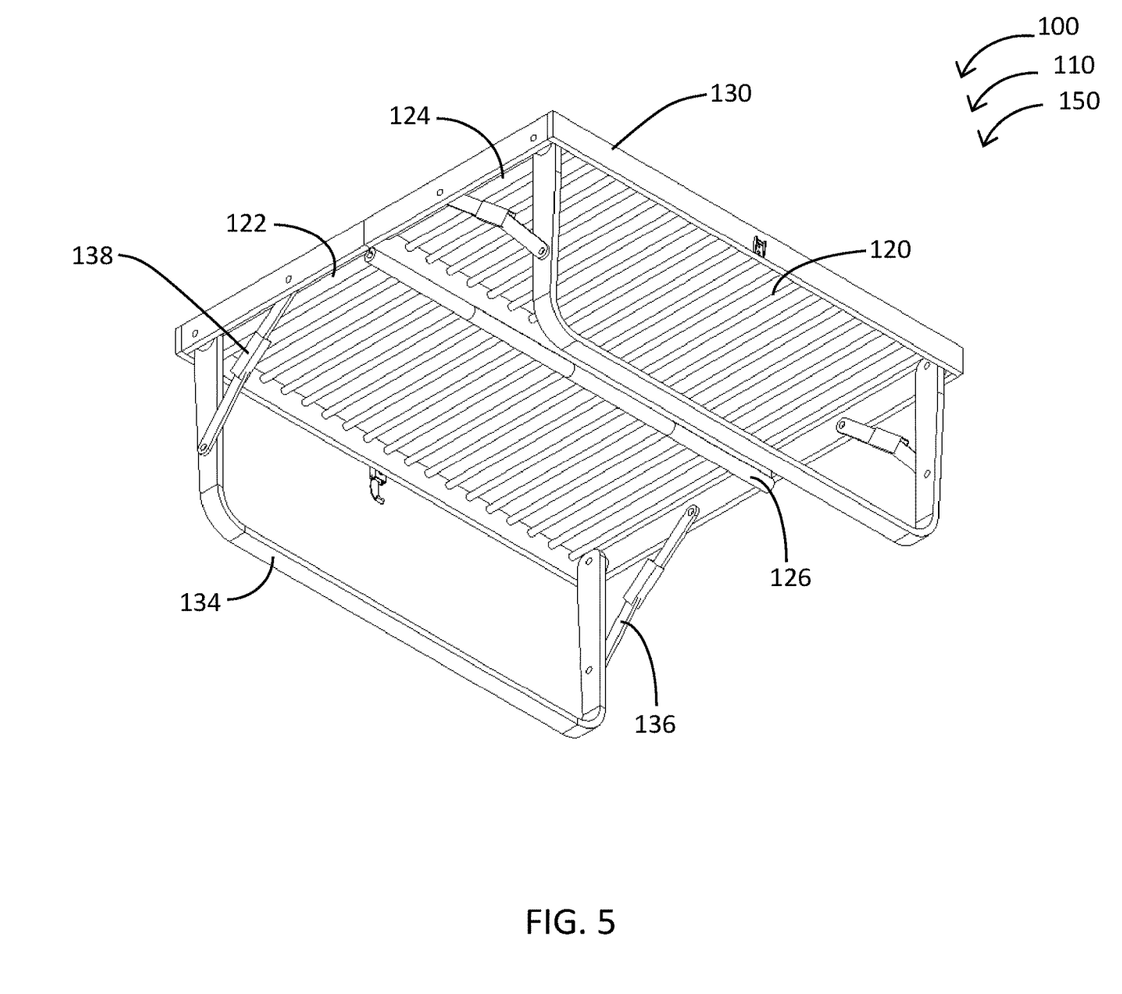
FIG. 5 is a perspective view of the portable cooking grill system of FIG. 1, according to an embodiment of the present disclosure.

FIG. 5 shows a perspective view of the portable cooking grill system 100 of FIG. 1, according to an embodiment of the present disclosure. As above, the portable cooking grill system 100 may include cooking grill assembly 110 comprising the grilling-rack 120 and the frame 130 in foldable functional combination such that the portable cooking grill system 100 is configured for portable cooking use and ease of storage. The portable cooking grill system 100 provides a collapsible compact grill with a detachable handle 160 that allows for minimalist use while backpacking or camping.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A portable cooking grill system, the portable cooking grill system comprising a cooking grill assembly including:
    a grilling-rack comprising a grate having a series of rack-members parallel to one another configured for direct placement of food for cooking, the grilling-rack further comprising a first-section and a second-section, said first-section and said second-section are hingedly connected via a connector allowing said grilling-rack to be foldable;
        the first section having an interior, a width, a length and a height;
        the second-section having an interior, a width, a length and a height that is the same as the width, the length and the height of the first-section, wherein each of the first-section and the second section include an interior length edge, an exterior length edge, a first width edge and a second width edge, and the connector hingedly connected to the interior length edge of the first-section and the interior length-edge of the second-section;
    a frame having a plurality of foldable legs configured to support said grilling-rack in an elevated position during use and fold into a compact state for a non-use-condition wherein the foldable legs fold into the interior of the first-section and the second-section respectively and fold within the height of the first-section and the second-section respectively; and
    a detachable handle for maneuvering said cooking grill assembly during use, the detachable handle attachable at a first point to the first section and at a second point to the second section and dimensioned to fit within a space created by the height of the first-section and the height of the second-section when said grilling-rack is folded; and
    wherein said cooking grill assembly comprises said grilling-rack and said frame in foldable functional combination such that said portable cooking grill system is configured for portable cooking use and ease of storage.

2. The portable cooking grill system of claim 1, wherein said plurality of foldable legs comprise a support member including a locking device for preventing collapsing of said frame during use.

3. The portable cooking grill system of claim 2, wherein said locking device comprises a sliding lock brace for supporting said plurality of foldable legs when in an extended position.

4. The portable cooking grill system of claim 2, wherein said frame comprises four of said plurality of foldable legs for supporting said grilling-rack.

5. The portable cooking grill system of claim 4, wherein said grilling-rack includes four corners, and wherein said plurality of foldable legs are positioned at each of the four corners of said grilling-rack providing a cooking platform.

6. The portable cooking grill system of claim 1, wherein said connector comprises a hinge allowing said first-section and said second-section to fold and pivot along a longest mutual edge between said first-section and said second-section.

7. The portable cooking grill system of claim 6, wherein said connector further comprises a lock.

8. The portable cooking grill system of claim 6, wherein said first-section and said second-section share a common plane during an in-use condition.

9. The portable cooking grill system of claim 8, wherein said first-section and said second-section pivot via said connector in relation to each other about a centerline axis.

10. The portable cooking grill system of claim 9, wherein said centerline axis passes through lengthwise.

11. The portable cooking grill system of claim 9, wherein said centerline axis does not pass through widthwise.

12. The portable cooking grill system of claim 1, wherein said detachable handle is removeably coupleable to said frame.

13. The portable cooking grill system of claim 12, wherein said detachable handle comprises a silicone cover.

14. The portable cooking grill system of claim 13, wherein said silicone cover is heat and fire resistant.

15. The portable cooking grill system of claim 1, wherein said connector is perpendicular to the series of rack-members.

16. The portable cooking grill system of claim 1, wherein said first-section and said second-section share a stacked plane during said non-use-condition.

17. The portable cooking grill system of claim 1, wherein said grilling-rack comprises a generally rectangular cooking platform.

18. The portable cooking grill system of claim 1, wherein said cooking grill assembly, when said plurality of foldable legs are in a locked position, is approximately 9 inches tall.

19. A portable cooking grill system comprising a cooking grill assembly including:
    a grilling-rack comprising a grate having a series of rack-members parallel to one another configured for direct placement of food for cooking, the grilling-rack further comprising a first-section and a second-section, said first-section and said second-section are hingedly connected via a connector allowing said grilling-rack to be foldable;
        the first section having an interior, a width, a length and a height;
        the second-section having an interior, a width, a length and a height that is the same as the width, the length and the height of the first-section, wherein each of the first-section and the second section include an interior length edge, an exterior length edge, a first width edge and a second width edge, and the connector hingedly connected to the interior length edge of the first-section and the interior length-edge of the second-section;
    a frame having a plurality of foldable legs configured to support said grilling-rack in an elevated position during use and fold into a compact state for a non-use-condition wherein the foldable legs fold into the interior of the first-section and the second-section respectively and fold within the height of the first-section and the second-section respectively;
    a detachable handle for maneuvering said cooking grill assembly during use, the detachable handle attachable at a first point to the first section and at a second point to the second section and dimensioned to fit within a space created by the height of the first-section and the height of the second-section when said grilling-rack is folded;

wherein said plurality of foldable legs comprise a support member including a locking device for preventing collapsing of said frame during use;

wherein said locking device comprises a sliding lock brace for supporting said plurality of foldable legs when in an extended position;

wherein said frame comprises four of said plurality of foldable legs for supporting said grilling-rack;

wherein said grilling-rack includes for corners, and wherein said plurality of foldable legs are positioned at each of the four corners of said grilling-rack providing a cooking platform;

wherein said connector comprises a hinge allowing said first-section and said second-section to fold and pivot along a longest mutual edge between said first-section and said second-section;

wherein said connector is perpendicular to the series of rack-members;

wherein said connector further comprises a lock;

wherein said first-section and said second-section share a common plane during an in-use condition;

wherein said first-section and said second-section share a stacked plane during said non-use-condition;

wherein said first-section and said second-section pivot via said connector in relation to each other about a centerline axis;

wherein said centerline axis passes through lengthwise;

wherein said centerline axis does not pass through widthwise;

wherein said detachable handle is removeably coupleable to said frame;

wherein said detachable handle comprises a silicone cover;

wherein said silicone cover is heat and fire resistant;

wherein said grilling-rack comprises a generally rectangular cooking platform; and wherein said cooking grill assembly comprises said grilling-rack and said frame in foldable functional combination such that said portable cooking grill system is configured for portable cooking use and ease of storage.

* * * * *